United States Patent [19]

Ohno et al.

[11] Patent Number: 4,759,869
[45] Date of Patent: Jul. 26, 1988

[54] LIQUID CRYSTALLINE CARBONIC ACID ESTER AND LIQUID CRYSTAL COMPOSITION CONTAINING SAME

[75] Inventors: Kouji Ohno; Kazutoshi Miyazawa; Hiromichi Inoue; Shinichi Saito; Takashi Inukai, all of Yokohamashi, Japan

[73] Assignee: Chisso Corporation, Osaka, Japan

[21] Appl. No.: 928,295

[22] Filed: Oct. 28, 1986

[30] Foreign Application Priority Data

Nov. 14, 1985 [JP] Japan .................. 60-255757

[51] Int. Cl.$^4$ .................. G02F 1/13; C09K 19/20; C09K 19/12; C09K 19/52; C07C 40/20
[52] U.S. Cl. .................. 252/299.67; 252/299.64; 252/299.65; 252/299.66; 252/299.01; 252/299.5; 350/350 R; 350/350 S; 558/271; 558/273
[58] Field of Search .................. 558/271, 273; 252/299.64, 299.65, 299.67, 299.66, 299.01; 350/350 R, 350 S

[56] References Cited

U.S. PATENT DOCUMENTS

| | | | |
|---|---|---|---|
| 4,065,489 | 12/1977 | Steinstrasser et al. | 252/299.65 |
| 4,576,732 | 3/1986 | Isogai et al. | 252/299.67 |
| 4,589,996 | 5/1986 | Inoue et al. | 252/299.65 |
| 4,613,209 | 9/1986 | Goodby et al. | 252/299.01 |
| 4,614,609 | 9/1986 | Inoue et al. | 252/299.65 |
| 4,615,586 | 10/1986 | Geary et al. | 252/299.01 |
| 4,643,842 | 2/1987 | Taguchi et al. | 252/299.67 |
| 4,647,398 | 3/1987 | Saito et al. | 252/299.67 |

FOREIGN PATENT DOCUMENTS

| | | | |
|---|---|---|---|
| 136725 | 4/1985 | European Pat. Off. | 252/299.65 |
| 164814 | 12/1985 | European Pat. Off. | 252/299.65 |
| 167328 | 1/1986 | European Pat. Off. | 252/299.67 |
| 191600 | 8/1986 | European Pat. Off. | 252/299.65 |

OTHER PUBLICATIONS

Gray, G. W., et al., Liquid Crystals & Plastic Crystals, vol. 1, pp. 142–143, John Wiley & Sons, Inc., New York, (1974).

Primary Examiner—Teddy S. Gron
Attorney, Agent, or Firm—Wenderoth, Lind & Ponack

[57] ABSTRACT

A ferroelectric liquid crystal compound having superior properties and a chiral smectic liquid crystal composition are provided. The ferroelectric liquid crystal compound is expressed by the formula

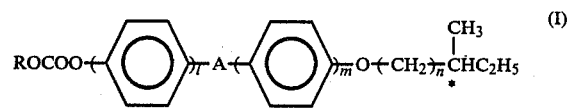

wherein R represents an alkyl group of 2–18 C; A, —COO— or —OCO—; l and m each, 1 or 2 but l+m=2 or 3; n, an integer of 2–8; and symbol *, an asymmetric carbon atom.

5 Claims, No Drawings

LIQUID CRYSTALLINE CARBONIC ACID ESTER AND LIQUID CRYSTAL COMPOSITION CONTAINING SAME

BACKGROUND OF THE INVENTION

1. Field of the Invention

This invention relates to a novel liquid crystal and a liquid crystal composition containing the same. More particularly it relates to a carbonic acid ester liquid crystal compound having an optically active group and that in an optically active form or in a racemic form as well as a chiral liquid crystal composition containing these.

2. Description of the Prior Art

At present, as to liquid crystal display elements, TN (Twisted Nematic) type display mode has been most broadly employed, but as far as the response speed is concerned, such TN type display elements are inferior to emissive type display elements (such as those of electroluminescence, plasma display, etc.). Although various improvements in this respect have been attempted, it appears that improvement to a large extent has not been achieved. Thus, various liquid crystal display devices based on a different principle from that of TN type display elements have been attempted. As one of such devices, there is a display mode utilizing a ferroelectric liquid crystal (N. A. Clark et al: Applied Phys. Lett., 36, 899 (1980)). This mode utilizes the chiral smectic C phase (hereinafter abbreviated to SC* phase) or the chiral smectic H phase (hereinafter abbreviated to SH* phase) of the ferroelectric liquid crystal, and those having these phases in the vicinity of room temperature are preferred.

As liquid crystal compounds exhibiting a chiral smectic phase, some compounds have already been known (for example, Japanese patent application laid-open Nos. Sho 53-22833/1978, Sho 60-54341/1985, etc.). However, in various respects, there is none exhibiting fully satisfactory properties.

SUMMARY OF THE INVENTION

The present inventors have searched for various liquid crystal compounds mainly in order to develop smectic liquid crystal compounds suitable to be used for the above-mentioned display mode and having superior properties.

The present invention resides in a liquid crystal compound expressed by the formula

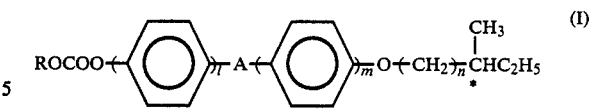

wherein R represents an alkyl group of 2 to 18 carbon atoms; A represents —COO— or —OCO—; l and m each represent 1 or 2, but l+m=2 or 3; n represents an integer of 2 to 8; and the symbol * represents an asymmetric carbon atom. The invention also provides a chiral smectic liquid crystal composition containing at least one kind of the above liquid crystal compound as a component thereof, the compound of the formula (I) including that in an optically active form based on the asymmetric carbon atom having the symbol * attached, and in a racemic form.

DETAILED DESCRIPTION OF PREFERRED EMBODIMENTS

The phase transition points of representative of compounds of the formula (I) are shown in Table 1.

TABLE 1

| Sample No. | \multicolumn{5}{c}{In formula (I)} | Optical activity | Phase transition point (°C.) | Note |
| --- | --- | --- | --- | --- | --- | --- | --- | --- |
| | R | A | l | m | n | | | |
| 1 | $C_5H_{11}$ | —COO— | 1 | 1 | 3 | Racemate | C · 17.4 · N · 49.6 · I | |
| 2 | $C_7H_{15}$ | —COO— | 1 | 1 | 3 | Racemate | SC · 38.5 · N · 51.3 · I | |
| 3 | $C_8H_{17}$ | —COO— | 1 | 1 | 3 | Racemate | C · 32.0 · SC · 40.3 · N · 54.7 · I | Example 1 |
| 4 | $C_{12}H_{25}$ | —COO— | 1 | 1 | 3 | Racemate | C · 51.9 · (SX · 42.2) · SC · 60.0 · I | |
| 5 | $C_9H_{19}$ | —COO— | 1 | 1 | 4 | (S) | C · 31.5 · SC* · 47.7 · Ch · 55.7 · I | |
| 6 | $C_9H_{19}$ | —COO— | 1 | 1 | 5 | Racemate | C · 41.4 · SC · 56.0 · N · 60.7 · I | |
| 7 | $C_9H_{19}$ | —COO— | 1 | 1 | 5 | (S) | C · 38.0 · SC* · 57.1 · Ch · 61.6 · I | Example 3 |
| 8 | $C_{12}H_{25}$ | —COO— | 1 | 1 | 5 | (S) | C · 43.8 · SC* · 66.4 · I | |
| 9 | $C_8H_{17}$ | —OCO— | 1 | 1 | 3 | (S) | C · 59.0 · (Ch · 58.0) · I | Example 2 |
| 10 | $C_8H_{17}$ | —OCO— | 1 | 1 | 5 | (S) | C · 56.5 · (SC* · 49.7) · Ch · 65.7 · I | |
| 11 | $C_9H_{19}$ | —OCO— | 1 | 1 | 5 | (S) | C · 55.5 · (SC* · 53.3) · Ch · 66.1 · I | |

In the column of the phase transition point, C represents a solid phase, N, a nematic phase, I, a transparent phase (homogeneous phase); SC, a smectic C phase; SC*, a chiral smectic C phase; Ch, a cholesteric phase; SX, an unidentified smectic X phase, respectively. The numeric figures placed between the dots indicate the transition points between both sides thereof. Further, the symbols and numeric figures within the parentheses each represent the upper limit temperature of the phase of the symbol appearing at the time of monotropic phase transition.

The compounds expressed by the formula (I) generally have a low melting point and exhibit SC or SC* phase within a suitable temperature range in the vicinity of room temperature. Thus, among the compounds of the formula (I), those in an optically active form are suitable as a material for liquid crystal display utilizing the ferromagnetic properties of SC* phase.

For example, the compound expressed by the following formula

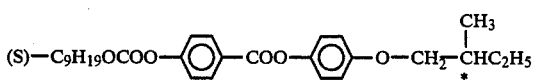

disclosed in Japanese patent application laid-open No. Sho 60-54341/1985 (Japanese patent application No. Sho 58-162766/1983 filed by the present assignee), has only a melting point, but no liquid crystal phase.

On the other hand, an optically active compound of the formula (I) wherein l and m each represent 1; n, 5; and R, $C_9H_{19}$, i.e. of the following formula

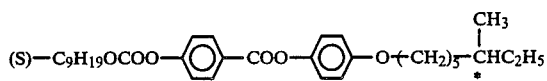

has phase transition points of C-SC* point 38.0° C., SC*-Ch point 57.1° C. and Ch-I point 61.6° C. and the temperature range of SC* phase is broad and in the vicinity of room temperature, as shown in Table 1 (sample No. 7).

As seen from the above comparison, the optically active compound expressed by the formula (I) is far superior.

The compound expressed by the formula (I) in a racemic form exhibits almost the same phase transition points as those of the corresponding optically active substance, but the racemic substance exhibits SC phase in place of SC* phase and exhibits N phase in place of Ch phase. Whereas when the racemic substance is mixed with the optically active substance, a composition exhibiting SC* phase is obtained. Further, such racemic substance, when added to a liquid crystal composition exhibiting SC* phase, is usable for adjusting the pitch of SC* phase as well as the pitch of the cholesteric phase.

Further, the compound of the formula (I) in an optically active form has an optically active carbon atom; hence when it is added to a nematic liquid crystal, it has a capability of inducing a twisted structure. The nematic liquid crystal having a twisted structure, i.e. a chiral nematic liquid crystal, does not form the so-called reverse domain of the TN display element; hence the compound of the formula (I) having an optical activity is usable as an agent for preventing the reverse domain from forming.

Next, preparation of the compound of the formula (I) of the present invention will be described.

Firstly, a compound of the formula (Ia), i.e. of the formula (I) wherein A represents —COO—, may be most suitably prepared through the following route:

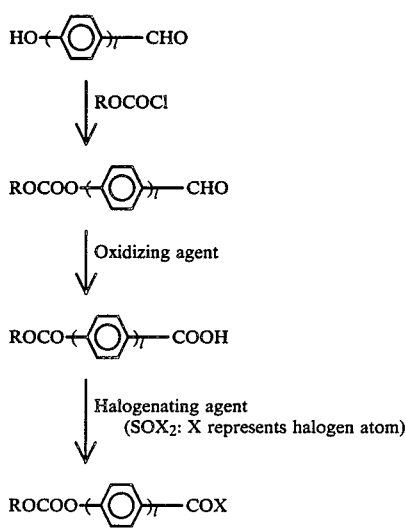

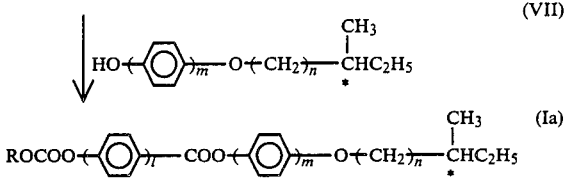

Namely, hydroxybenzaldehyde of the formula (II) is firstly reacted with an alkyl chloroformate in the presence of a basic solvent to obtain an alkylcarbonyloxybenzaldehyde (IV), which is then oxidized to obtain an alkyloxycarbonyloxbenzoic acid (V), which is then reacted with a halogenating agent such as $SoCl_2$ to obtain an acid chloride (VI), which is then reacted with a phenol of the formula (VII) corresponding to the final objective product in the presence of a basic solvent to obtain the objective compound of the formula (Ia).

Further, the compound of the formula (VII) used at the above final step may be obtained through the following route:

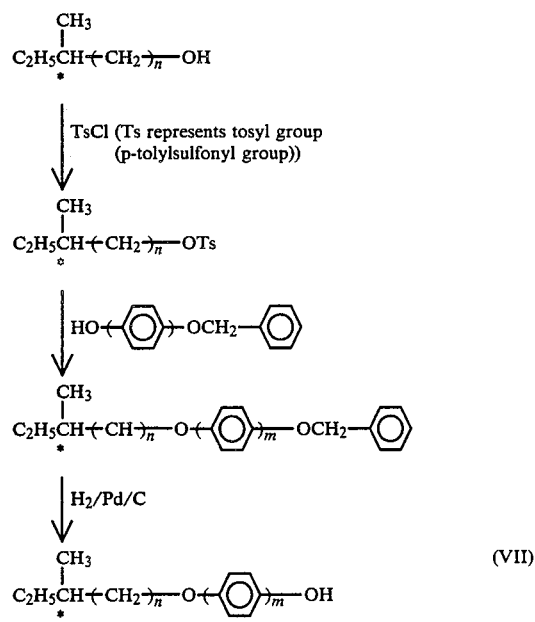

Namely, various alcohols prepared according to a known process (such as M.C.L.C. 27,417 (1973)) are tosylated, and hydroquinone monobenzyl ether or 4-benzyloxy-4'-hydroxybiphenyl is etherified with the tosyl ester obtained above, followed by removing the benzyl group to obtain the compound of the formula (VII). In this case, if an optically active alcohol is used as a starting raw material, the compound of the formula (VII) in an optically active form is obtained, while if a racemic alcohol is used, the compound of the formula (VII) in a racemic form is obtained.

Next, the compound (Ib), i.e. a compound of the formula (I) wherein X represents —OCO—, may be most suitably prepared according to the following route:

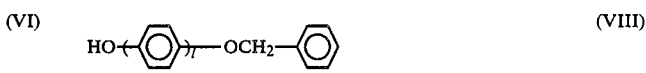

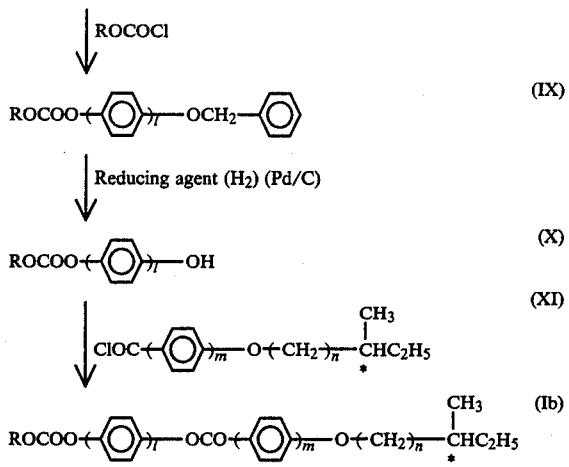

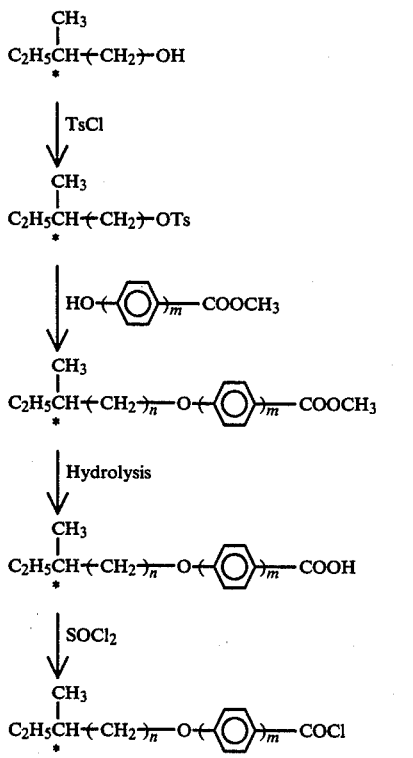

Namely, a compound of the formula (VIII) is reacted with an alkyl chloroformate in the presence of a basic solvent to obtain a compound (IX), followed by reducing the reaction product to obtain a compound (X), which is reacted with an acid halide (XI) having an optically active group, which corresponds to the final objective product, in the presence of a basic solvent to obtain the objective compound (Ib).

Further, the compound of the formula (XI) used at the above final step may be obtained according to the following route:

Namely, methyl 4-hydroxybenzoate or methylbiphenyl 4-hydroxy-4'-carboxylate is etherified with a tosyl ester obtained by tosylating various alcohols prepared according to a known method, followed by hydrolyzing the reaction product to remove the methyl ester group, reacting the resulting material with a halogenating agent to obtain a compound of the formula (XI). Here, if an optically active alcohol is used as a starting raw material, the compound of the formula (XI) in an optically active form is obtained, while if a racemic alcohol is used as a starting raw material, the compound of the formula (XI) in a racemic form is obtained.

The compound and the composition of the present invention will be described by way of Examples.

EXAMPLE 1

Preparation of (±)-p-octyloxycarbonyloxybenzoic acid p'-(4-methylhexyloxy)phenyl ester (a compound of the formula (I) wherein $R=C_8H_{17}$; $A=-COO-$, $l=1$, $m=1$ and $n=3$, and which is in a racemic form; sample No. 3).

(i) Preparation of p-octyloxycarbonyloxybenzoic acid chloride (VI)

Octyl chloroformate (23.1 g, 0.12 mol) was added to and reacted with a solution of p-hydroxybenzaldehyde (III) (16 g, 0.18 mol) dissolved in dry pyridine (100 ml), followed by allowing the reaction mixture to stand overnight, thereafter extracting it with toluene, washing the organic layer with 6N-hydrochloric acid, then with 2N-NaOH aqueous solution and further with water until the washing water became neutral, and distilling off toluene to obtain p-octyloxycarbonyloxybenzaldehyde (IV) (33.2 g), dissolving this compound (20.5 g, 0.07 mol) in acetic acid (60 ml), dropwise adding a solution of anhydrous chromic acid (14 g, 0.14 mol) dissolved in water (11 ml) and acetic (17 ml) to the above solution being agitated, keeping the inner temperature at 40° C. on a water bath for 4 hours after completion of the dropwise addition, thereafter cooling the reaction mixture, adding water (300 ml), filtering the deposited crystals, recrystallizing from ethanol to obtain p-hexyloxycarbonyloxybenzoic acid (V) (7 g), adding thereto thionyl chloride (10 ml), heating the mxiture under reflux for one hour, and distilling off excess thionyl chloride to obtain the objective p-hexyloxycarbonyloxybenzoic acid chloride (VI) (7.5 g).

(ii) Preparation of (±)-p-(4-methylhexyloxy)phenol (VII)

(±)-4-Methylhexanol in a racemic form (170 g, 1.46 mol) prepared according to a method described in a literature (M.C.L.C., 27,417 (1974) was dissolved in dry pyridine (566 ml), followed by dropwise adding to the resulting solution, a solution of p-toluenesulfonyl chloride (274 g, 1.46 mol) dissolved in toluene (402 ml) under ice cooling with stirring, slowly returning the temperature to room temperature after completion of the dropwise addition, allowing the reaction mixture to stand overnight, extracting with toluene, washing the resulting organic layer with 6N-hydrochloric acid, then with 2N-NaOH aqueous solution, further with water until the washing water became neutral, and distilling off the solvent to obtain an oily (±)-p-(4-methylhexyl)-toluenesulfonate (305 g).

To a solution of pentyloxyphenol (50 g, 0.25 mol) dissolved in ethanol (250 ml) was added a solution of NaOH (12 g, 0.30 mol) dissolved in water (12 ml), followed by dropwise adding to the mixture, (±)-p-(4-methylhexyl)toluenesulfonate (79 g, 0.27 mol), heating the resulting mixture under reflux for 10 hours, distilling off ethanol after completion of the reaction, extracting with toluene, washing the resulting organic layer with 6N-hydrochloric acid, then with 2N-NaOH aqueous solution, further with water until the washing water became neutral, distilling off the solvent to obtain an oily (±)-p-benzyloxyphenyl 4-methylhexyl ether (79 g) and subjecting this p-benzyloxyphenyl 4-methylhexyl ether to hydrogenolysis with 5% paradium-carbon to obtain the objective (±)-p-(4-methylhexyloxy)phenol (VII) (37 g).

(iii) Esterification p-Hexyloxycarbonyloxybenzoic acid chloride (44 g, 0.01 mol) prepared in the paragraph (i) was added to and reacted with a solution of (±)-p-(4-methylhexyloxy)phenol (VII) (5 g, 0.02 mol) prepared in the paragraph (ii), dissolved in pyridine (30 ml), followed by allowing the reaction mixture to stand overnight, extracting with toluene, washing the resulting organic layer with 6N-hydrochloric acid, then with 2N-NaOH aqueous solution, further with water until the washing water became neutral, distilling off toluene and recrystallizing the residue from ethanol to obtain the objective p-hexyloxycarbonyloxybenzoic acid p'-(4-methylhexyloxy)phenyl ester (5 g). This product exhibited a smectic C liquid crystal phase and a nematic liquid crystal phase, and its phase transition points were as follows:

C-SC point 32.0° C., SC-N point 40.3° C. and N-I point 54.7° C. When octyl chloroformate used in the paragraph (i) is replaced by various alkyl chloroformates, it is possible to obtain compounds of the formula (I) wherein A represents —COO—, having other alkyl groups.

EXAMPLE 2

Preparation of optically active (S)-p-(4-methylhexyloxy)benzoic acid p'-octyloxycarbonyloxyphenyl ester (a compound of the formula (I) wherein $R=C_8H_{17}$, A=—OCO—, l=1, m=1 and n=3 and which is optically active; sample No. 9)

(i) Preparation of p-octyloxycarbonyloxyphenol (X)

Hexyl chloroformate (10.2 g, 0.05 mol) was added to a solution of p-benzyloxyphenol (VIII) (15.6 g, 0.08 mol) dissolved in dry pyridine (200 ml), followed by allowing the mixture to stand overnight at room temperature, extracting the resulting reaction mixture with toluene after completion of the reaction, washing the resulting organic layer with 6N-hydrochloric acid, then with 2N-NaOH aqueous solution, further with water until the washing water became neutral, distilling off the solvent to obtain p-(octyloxycarbonyloxyphenyl)-benzyl ether (IX) (14.2 g), and subjecting this ether to hydrogenolysis with 5% paradium-carbon (1.4 g) to obtain p-octyloxycarbonyloxyphenol (X) (6.31 g).

(ii) Preparation of (S)-p-(4-methylhexyloxy)benzoic acid choride (XI)

KOH (5 g, 0.09 mol) was added to a solution of methyl p-hydroxybenzoate (13.6 g, 0.09 mol) dissolved in methanol (66 ml), followed by dissolving these together on heating, adding (S)-p-(4-methylhexyloxy)toluenesulfonate (20 g, 0.07 mol) prepared from 4-methylhexanol in the same manner as in Example 1, (ii), heating the mixture under reflux for 10 hours, extracting the reaction mixture with toluene after completion of the reaction, distilling off the solvent, to obtain methyl (S)-p-(4-methylhexyloxy)benzoate (17 g), adding to a solution of this product dissolved in ethanol (7.5 ml), a solution of NaOH (4.9 g, 0.14 mol) dissolved in water (24.6 ml), heating the mixture under reflux for 5 hours, pouring the resulting reaction mixture into 6N-hydrochloric acid (90 ml) having the ice added, allowing the mixture to stand overnight, recrystallizing the resulting crystals from heptane to obtain (S)-p-(4-methylhexyloxy)benzoic acid (6.5 g), adding thionyl chloride (20 ml) to the benzoic acid (5 g, 0.02 mol), heating the mixture under reflux for one hour, and distilling off excess thionyl chloride to obtain p-(4-methylhexyloxy)benzoic acid chloride (XI) (5 g).

(iii) Esterification

To a solution obtained by dissolving p-octyloxycarbonyloxyphenol (5 g, 0.012 mol) obtained above in the paragraph (i) in pyridine (30 ml) was added (S)-p-(4-methylhexyloxy)benzoic acid chloride (5 g, 0.02 mol) obtained above in the paragraph (ii), followed by subjecting the mixture to the same procedure as in Example 1 to obtain the objective optically active (S)-p-(4-methylhexyloxy)benzoic acid p'-octyloxycarbonyloxyphenyl ester. This compound exhibited monotropic, cholesteric liquid crystal phase, and its phase transition points were as follows: C-I point 59.0° C, I-Ch point 58.0° C. (monotropic).

By replacing hexyl chloroformate used in (i) by other alkyl chloroformates, it is possible to obtain compounds of the formula (I) wherein A represents —OCO—, having other alkyl groups.

EXAMPLE 3

Preparation of optically active (S)-4-nonyloxycarbonyloxybenzoic acid 4'-(6-methyloctyloxy)phenyl ester (a compound of the formula (I) wherein $R=C_9H_{19}$, A=—COO—, l=1, m=1, n=5 and which is optically active; sample No. 7)

(i) Preparation of 4-nonyloxycarbonyloxybenzoic acid chloride (VI)

To a solution of 4-hydroxybenzaldehyde (II) (16 g, 0.181 mol) dissolved in dry pyridine (100 ml) was added nonyl chloroformate (24.7 g, 0.119 mol) to react these together, followed by sufficiently agitating the reaction mixture, allowing it to stand overnight, adding toluene (100 ml) and water (100 ml), washing the mixture with 6N-hydrochloric acid, then with 2N-NaOH aqueous solution, further with water until the washing water became neutral, distilling off toluene to obtain 4-nonyloxycarbonyloxyaldehyde (IV) (33.2 g), dissolving this product (20.5 g, 0.07 mol) in acetic acid (60 ml), dropwise adding to the resulting solution being agitated, a solution of anhydrous chromic acid (14 g, 0.140 mol) dissolved in water (11 ml) and acetic acid (17 ml), while keeping the temperature of the system at 30° C. or lower, keeping the inner temperature at 40° C. on a water bath for 4 hours after completion of the reaction, cooling the resulting material, adding water (300 ml), filtering deposited crystals, washing the crystals with water and recrystallizing from ethanol to obtain 4-nonyloxycarbonyloxybenzoic acid (V) (7 g) having a melting point of 118.8°~120.4° C., adding to this product (7 g, 0.028 mol), thionyl chloride (6 g, 0.050 mol), heating the mixture under reflux for one hour, and distilling off excess thionyl chloride to obtain 4-nonyloxycarbonyloxybenzoic acid chloride (VI) (7.5 g).

(ii) Preparation of (S)-p-6-methloctyloxyphenol (VII)

A solution of p-toluenesulfonyl chloride (19.9 g, 0.1 mol) dissolved in toluene (30 ml) was dropwise added with stirring under ice cooling, to a solution of 6-methyloctanol (15.4 g, 0.1 mol) prepared according to the method of a literature (M.C.L.C. 27,417 (1974)) and dissolved in dry pyridine (43 ml), followed by slowly returning the temperature to room temperature, allowing the resulting material to stand overnight, extracting the reaction mixture with toluene after completion of the reaction, washing the resulting organic layer with 6N-hydrochloric acid, then with 2N-NaOH aqueous solution, further with water until the washing water became neutral, drying the layer, and distilling off toluene to obtain oily (S)-6-methyloctyl-p-toluenesulfonate (26.1 g).

A solution of NaOH (40 g) dissolved in water (18 ml) was added to a solution of p-benzyloxyphenol (12 g, 0.060 mol) dissolved in ethanol (60 ml), followed by dropwise adding to the mixture, (S)-6-methyloctyl-p-toluenesulfonate (16.7 g, 0.055 mol) obtained above, refluxing the resulting mixture for 12 hours, distilling off ethanol after completion of the reaction, extracting the residue with toluene, washing the resulting ortanic layer with 6N-hydrochloric acid, then with 2N-NaOH aqueous solution, further with water until the washing water became neutral, drying the layer, distilling off the organic solvent to obtain an oily product, and subjecting this product to column chromatography with activated alumina (17 g) to obtain (S)-p-benzyloxyphenyl 6-methyloctyl ether (15 g), dissolving this product (15 g, 0.046 mol) in ethanol (43 ml), subjecting the solution to hydrogenolysis in the presence of paradium-carbon (1.5 g) to obtain (S)-p-6-methyloctyloxyphenol (XII) (8.2 g).

(iii) Esterification

To a solution of (S)-p-6-methyloctyloxyphenol (0.5 g, 0.002 mol) prepared in the above paragraph (ii) and dissolved in pyridine (3 ml) was added 4-nonyloxycarbonyloxybenzoic acid chloride (0.44 g, 0.001 mol) prepared in the above paragraph (i) and the mixture was reacted together, followed by allowing the reaction mixture to stand overnight, adding toluene (50 ml) and water (50 ml), extracting with toluene, washing the resulting organic layer with 6N-hydrochloric acid, then with 2N-NaOH aqueous solution, further with water until the washing water became neutral, drying the layer, distilling off toluene and recrystallizing the residue from ethanol to obtain the objective (S)-4-nonyloxycarbonyloxybenzoic acid 4'-(6-methyloctyloxy)phenyl ester (0.5 g). This product exhibited a smectic liquid crystal phase and a cholesteric liquid crystal phase, and its phase transition points were as follows: C-SC* point 38.0° C., SC*-Ch point 57.1° C., Ch-I point 61.6° C.

By replacing nonyl chloroformate of the above paragraph (i) by various alkyl chloroformates and in the same procedure as above, it is possible to obtain compounds of the formula (I) wherein A represents —COO—, having other alkyl groups.

EXAMPLE 4

A nematic liquid crystal composition consisting of

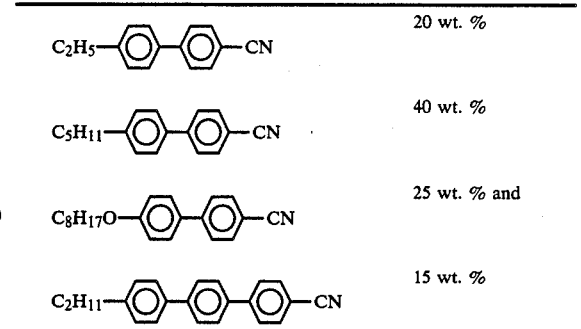

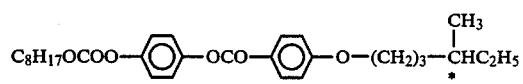

was filled in a cell provided with transparent electrodes having polyvinyl alcohol (PVA) as an aligning treatment agent applied thereon and having the resulting surface rubbed to effect parallel aligning treatment, and having a distance between the electrodes of 10 μm, to prepare a TN type display cell, which was then observed with a polarizing microscope. As a result, a reverse twist domian was observed to be formed.

To the above nematic liquid crystal composition was added the compound of sample No. 9 of the present invention i.e.

$$C_8H_{17}OCOO-\bigcirc-OCO-\bigcirc-O-(CH_2)_3-\overset{CH_3}{\underset{*}{C}HC_2H_5}$$

in a quantity of 1% by weight, and the resulting composition was similarly observed with a TN type cell. As a result, the reverse twist was dissolved and a uniform nematic phase was observed.

EXAMPLE 5

Using liquid crystal compounds of sample Nos. 2, 3 and 5 of the above Table 1 of the present invention and other liquid crystal compositions, the following liquid crystal composition was prepared:

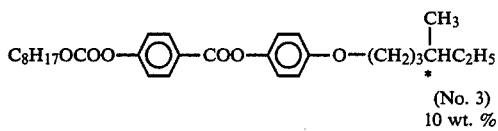

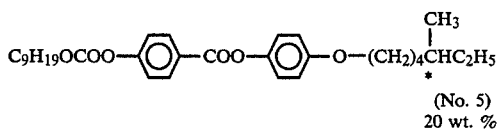

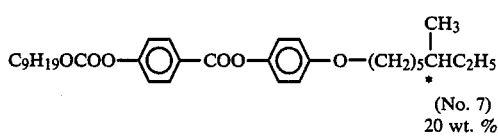

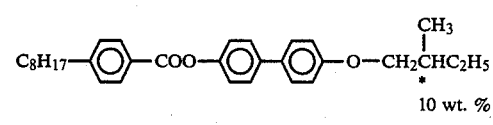

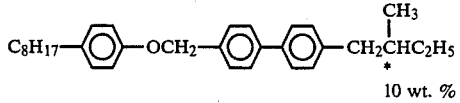

-continued

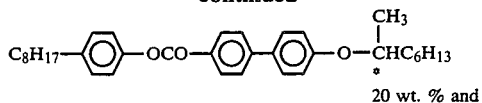
20 wt. % and

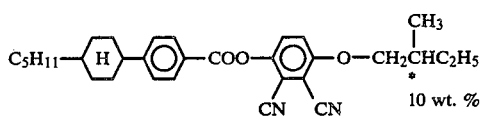
10 wt. %

In the preparation of the composition, the above 7 kinds of liquid crystal compounds were weighed each in a definite quantity, and mixed in a sample bottle while being dissolved together on heating.

The resulting composition was filled in a cell provided with transparent electrodes having PVA as an alignment treatment agent applied thereon and having the resulting surface rubbed to effect parallel alignment treatment and having a cell thickness of 2 μm, followed by providing the resulting liquid crystal element between two sheets of crossed polarizers and impressing an electric field thereon. As a result, when 20 V was impressed, change in the intensity of transmitted light was observed. From the change in the intensity of transmitted light at that time was sought the response time, which was about 0.4 m sec at 25° C.

In addition, with the above liquid crystal composition, the temperature change of the texture was observed by means of a polarizing microscope. As a result, it was found that a ferroelectric liquid crystal was formed in the temperature range of 0° to 55° C.; the value of the spontaneous polarization was 10 nC/cm$^3$; and the tilt angle was 26°.

What we claim is:

1. A liquid crystal compound expressed by the formula

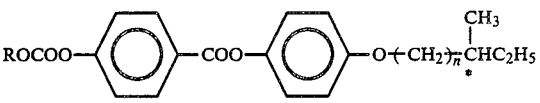

wherein R represents an alkyl group of 5 to 12 carbon atoms; n represents an integer of 3 to 5; and the symbol * indicates an asymmetric carbon atom.

2. A liquid crystal compound according to claim 1 in an optically active form based on the asymmetric carbon atom indicated by the symbol *.

3. A liquid crystal compound according to claim 1 in a racemic form.

4. A chiral smectic liquid crystal composition having at least two components at least one of which is a liquid crystal compound as set forth in claim 2.

5. A ferroelectric liquid crystal light switching element that includes a chiral smectic liquid crystal composition as set forth in claim 4.

* * * * *